United States Patent
Stamp

(10) Patent No.: US 10,260,808 B2
(45) Date of Patent: Apr. 16, 2019

(54) CARBON DIOXIDE PRODUCTION

(71) Applicant: Clive R. Stamp, Ipswich (GB)

(72) Inventor: Clive R. Stamp, Ipswich (GB)

(73) Assignee: ROCKFUEL INNOVATIONS LIMITED, Lexden Colchester Essex (GB)

( * ) Notice: Subject to any disclaimer, the term of this patent is extended or adjusted under 35 U.S.C. 154(b) by 102 days.

(21) Appl. No.: 15/370,267

(22) Filed: Dec. 6, 2016

(65) Prior Publication Data
US 2017/0082363 A1 Mar. 23, 2017

Related U.S. Application Data

(63) Continuation of application No. 13/990,849, filed as application No. PCT/GB2011/052383 on Dec. 2, 2011, now abandoned.

(30) Foreign Application Priority Data

Dec. 7, 2010 (GB) .................................. 1020725.6

(51) Int. Cl.
F27B 7/10 (2006.01)
G21D 9/00 (2006.01)
(Continued)

(52) U.S. Cl.
CPC .................. F27B 7/10 (2013.01); C01B 3/02 (2013.01); C01B 32/50 (2017.08); C04B 2/10 (2013.01);
(Continued)

(58) Field of Classification Search
CPC ... G21D 9/00; F27B 7/10; F27B 15/00; F27B 15/14; F27B 7/36; C01B 3/02; C01B 32/50; C04B 2/10; C10G 2/50; G21C 1/07
(Continued)

(56) References Cited

U.S. PATENT DOCUMENTS

| | | | | |
|---|---|---|---|---|
| 3,430,936 A | * | 3/1969 | M Etzger | F27B 7/04 165/88 |
| 3,838,848 A | * | 10/1974 | Jaquay | F27B 7/00 266/173 |
| 4,087,976 A | | 5/1978 | Morrow, Jr. et al. | |
| 4,299,660 A | * | 11/1981 | Quade | G21C 1/324 376/317 |
| 4,761,260 A | * | 8/1988 | Schmitt | G21C 1/07 367/317 |

(Continued)

FOREIGN PATENT DOCUMENTS

| | | |
|---|---|---|
| CN | 201280515 | 7/2009 |
| EP | 2223892 | 1/2010 |
| GB | 1174129 | 12/1969 |
| JP | 8173935 | 7/1996 |
| JP | 10205731 | 8/1998 |
| JP | 2003343977 | 12/2003 |

Primary Examiner — Jack W Keith
Assistant Examiner — Daniel Wasil
(74) Attorney, Agent, or Firm — Renner Kenner Greive Bobak Taylor & Weber

(57) ABSTRACT

Apparatus for the production of carbon dioxide from limestone includes a nuclear reactor (10) for generating heat and a rotary kiln (12). The rotary kiln (12) has an inlet (28) for the introduction of limestone and an outlet (30) for the release of carbon dioxide. A heat transfer arrangement is provided for transferring heat from the nuclear reactor (10) to the interior of the rotary kiln (12). The heat transfer arrangement includes feed and return primary conduits (17,18) for passing a heat transfer fluid (14) through the nuclear reactor (10) so that heat may be extracted from the nuclear reactor (10) for transfer to the interior of the rotary kiln (12). Limestone in the rotary kiln (12) is thereby heated to a temperature sufficient for the release of carbon dioxide.

13 Claims, 2 Drawing Sheets

Figure 1:
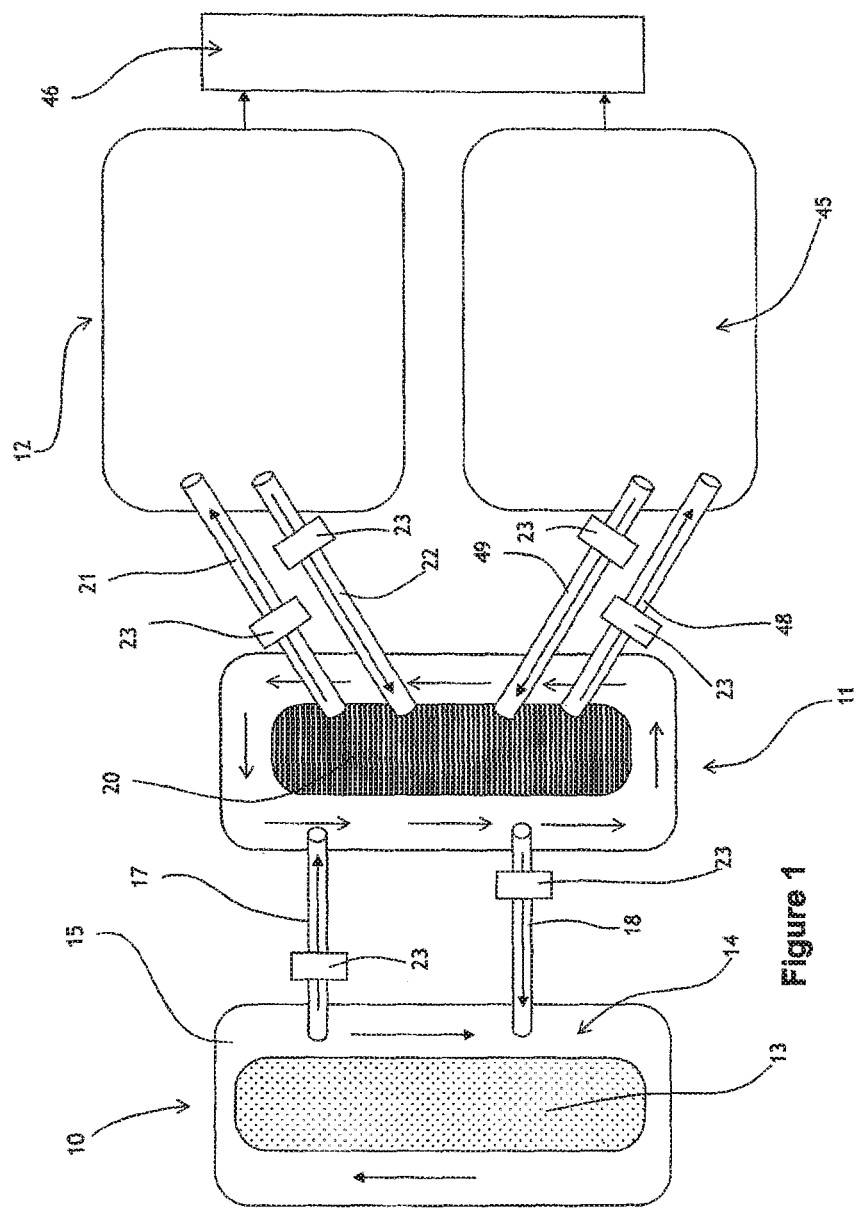

(51) Int. Cl.
| | |
|---|---|
| *C04B 2/10* | (2006.01) |
| *F27B 15/00* | (2006.01) |
| *C01B 3/02* | (2006.01) |
| *C10G 2/00* | (2006.01) |
| *F27B 7/36* | (2006.01) |
| *F27B 15/14* | (2006.01) |
| *G21C 1/07* | (2006.01) |
| *C01B 32/50* | (2017.01) |

(52) U.S. Cl.
CPC ............... *C10G 2/50* (2013.01); *F27B 7/36* (2013.01); *F27B 15/00* (2013.01); *F27B 15/14* (2013.01); *G21C 1/07* (2013.01); *G21D 9/00* (2013.01); *Y02E 60/364* (2013.01); *Y02P 20/129* (2015.11); *Y02P 40/42* (2015.11)

(58) Field of Classification Search
USPC .................................................. 376/317, 402
See application file for complete search history.

(56) References Cited

U.S. PATENT DOCUMENTS

| | | | |
|---|---|---|---|
| 5,309,492 A | 5/1994 | Adams | |
| 8,073,096 B2 * | 12/2011 | El-Genk | ............. F28D 15/0233 |
| | | | 376/317 |
| 2004/0137289 A1 | 7/2004 | Lin | |
| 2009/0208402 A1 | 8/2009 | Rossi | |
| 2010/0210885 A1 * | 8/2010 | McKee | ................... C01B 3/042 |
| | | | 585/310 |

* cited by examiner

CARBON DIOXIDE PRODUCTION

CROSS REFERENCE TO RELATED APPLICATIONS

This application is a continuation of pending U.S. patent application Ser. No. 13/990,849, filed May 31, 2013, which is a 371 national phase application of International Application No. PCT/GB2011/052383, filed Dec. 2, 2011, now expired, which claims priority from UK Patent Application No. GB 1020725.6, filed Dec. 7, 2010, the disclosures of which are incorporated herein by reference.

TECHNICAL FIELD

This invention relates to apparatus for the production of carbon dioxide from limestone and also to a method for producing carbon dioxide. The invention finds particular use in the production of carbon dioxide for the subsequent manufacture of a synthetic fuel.

BACKGROUND OF THE INVENTION

Fossil fuels are non-renewable energy sources which are rapidly depleting. The combustion of fuel manufactured from crude oil creates large quantities of greenhouse gases. With increasing concerns of climate change due to greenhouse gases, there is a need to reduce the amount of air pollution caused by the combustion of fuels and by industrial manufacturing processes. Due to the limited number of oil reserves, it is necessary to transport large quantities of oil from the oil reserves to the consuming areas, often over great distances. The transportation of oil in this way inevitably increases the problem of pollution.

In an attempt to reduce fossil fuel use and eliminate pollution caused by the burning of such fuels, there is an increasing need for sustainable energy sources. Processes for producing synthetic fuels using carbon dioxide and hydrogen are well established. However, obtaining carbon dioxide directly from the atmosphere is not only expensive but is also problematic in that the extraction process creates even yet more pollution.

SUMMARY OF THE INVENTION

It is a principal aim of the present invention to address the environmental damage caused by the combustion of fossil fuels and to provide apparatus and a method for producing carbon dioxide from limestone which can be used to generate a synthetic and sustainable fuel. The invention aims to reduce energy consumption and the production of harmful emissions in the manufacture of synthetic fuels, and so have a smaller impact on the environment and climate change.

According to a first aspect of this invention, there is provided apparatus for the production of carbon dioxide from limestone, comprising:
 a nuclear reactor for generating heat;
 a rotary kiln having an inlet for the introduction of limestone and an outlet for the release of carbon dioxide; and
 a heat transfer arrangement for transferring heat from the nuclear reactor to the interior of the rotary kiln, the heat transfer arrangement including feed and return primary conduits for passing a heat transfer fluid through the nuclear reactor to extract heat therefrom for transfer to the interior of the rotary kiln thereby to heat the limestone to a temperature sufficient for the release of carbon dioxide.

According to a second but related aspect of this invention, there is provided a method for producing carbon dioxide from limestone comprising the steps of:
 a) generating heat using a nuclear reactor;
 b) transferring heat from the nuclear reactor to the interior of a rotary kiln having an inlet for the introduction of limestone thereto and an outlet for the release of carbon dioxide therefrom, by circulating a heat transfer fluid through feed and return primary conduits through the nuclear reactor and transferring heat from the heated heat transfer fluid to the interior of the rotary kiln;
 c) introducing limestone into the rotary kiln through the inlet thereof;
 d) operating the rotary kiln to rotate and tumble limestone therein; and
 e) collecting carbon dioxide released from the outlet of the rotary kiln;
 wherein the heat transferred to the interior of the rotary kiln and rotation thereof causes calcination of the limestone therein to produce carbon dioxide.

Calcination of limestone by heating releases carbon dioxide and produces quicklime. The heating of limestone in conventional rotary kilns is carried out by burning fossil fuels, which is environmentally unsustainable. The apparatus of this invention addresses this problem by using the heat generated by a nuclear reactor to heat the limestone in a rotary kiln. The heat required by the rotary kiln in order most efficiently to release carbon dioxide from limestone is in the region of 900° C. to 950° C., though of course, carbon dioxide can be released at lower temperatures.

To facilitate the transfer of heat from the nuclear reactor to the rotary kiln, it is highly preferred that the heat transfer arrangement includes a heat exchanger through which the heat transfer fluid is passed for the supply of heat from the nuclear reactor to the heat exchanger. By providing a heat exchanger in this way the heat transfer fluid may be maintained separate from the rotary kiln so providing enhanced safety. A suitable heat transfer fluid may be helium which has a low tendency to absorb neutrons and become radioactive. Preferably, the heat exchanger comprises a water boiler to generate steam and a secondary conduit for the steam generated by the boiler, to feed steam to the rotary kiln for heating limestone therein. Ideally, the secondary conduit comprises a feed secondary conduit for the supply of steam to the rotary kiln and a return secondary conduit for the re-circulation of cooled steam from the rotary kiln to the boiler. In this way, once the steam has served its purpose in heating the limestone and has thus cooled it may be returned to the boiler to be heated by the transfer of heat from the heat transfer fluid.

Preferably, the rotary kiln comprises an outer generally cylindrical vessel for containing the limestone and mounted for rotation about a generally horizontal axis or an axis inclined at a small angle to the horizontal. An inner chamber may be mounted co-axially within the vessel so that in use the outer rotary vessel rotates about the stationary inner chamber mixing and tumbling the limestone over the inner chamber. In this arrangement the secondary conduit should feed heated steam to the stationary inner chamber to pass therethrough, so as to transfer heat to the limestone in the outer rotary vessel. The heated steam may be fed into and withdrawn from the inner stationary chamber by supply and return pipes. Such pipes must be made from a material able to withstand elevated pressures and temperatures for long periods as well as oxidisation, scaling, warping and sigma phase embrittlement. A suitable material may be specialised reinforced stainless steel.

The production of carbon dioxide from limestone is preferably carried out as a batch type process rather than a continuous process. This allows calcinated limestone (in the form of quicklime) to be discharged from the kiln and a fresh charge of limestone to be added to the kiln, while the rotary vessel is held stationary. Suitable valve arrangements should be provided for openings into the rotary kiln to allow the removal of quicklime and the introduction of limestone. The heat exchanger may comprise a feed third conduit for steam generated by the boiler, to feed steam to a hydrogen plant for the production of hydrogen. By connecting the apparatus to a hydrogen plant, the overall system can be used as part of a synthetic fuel production system, by producing both of the necessary components: carbon dioxide and hydrogen. Carbon dioxide and hydrogen can be processed to produce a synthetic fuel using any of the known methods, such as the Sabatier reaction. Ideally, the apparatus also includes a return third conduit for the re-circulation of steam from the hydrogen plant to the boiler.

The cooled waste quicklime released from the kiln will absorb carbon dioxide from the atmosphere. The quicklime could be used in vehicle exhaust filters or along motorways to absorb carbon dioxide from vehicle exhaust gases, or could be made into mortar-like slabs which could be utilised in sea defences, new quays and the like. Quicklime is particularly good at absorbing carbon dioxide when placed in water, and this characteristic could be most beneficial in projects around the coastline. Thus the process could become carbon neutral. So that quicklime produced by the calcination of limestone in the apparatus may be readily used for other purposes, the apparatus may further comprise a heat exchanger in communication with the rotary kiln for receiving and extracting heat from the quicklime produced in the rotary kiln, following the discharge thereof. This may be done by blowing air over the quicklime and passing the heated air through an air-to-fluid heat exchanger, so as to produce hot liquid, such as hot water (which may initially be in the form of steam) for other uses.

Preferably the apparatus includes a pre-heater for heating the limestone prior to the introduction thereof to the rotary kiln, to prevent a sudden temperature drop within the kiln. This process is beneficial in heating any fine particles of limestone. Advantageously, the pre-heater may be connected to the air-to-fluid heat exchanger for the supply of heat from the air-to-fluid heat exchanger to the pre-heater. In this way, heat removed from the quicklime by the air-to-fluid heat exchanger can be recycled back into the apparatus.

The nuclear reactor is preferably a pebble bed nuclear reactor. Other types of nuclear reactor can be used and, if such a reactor does not operate at a sufficiently high temperature the steam may be heated to a temperature above 800° C. by an auxiliary heater incorporated into the apparatus. A pebble bed reactor is preferred because it will automatically close down in the very unlikely event of a reactor core accident and is capable of generating very high temperatures while being passively safe. This is because any radioactive isotopes are maintained within the reactor core thus ensuring safety should there occur a failure of the system. In the unlikely case of an accident it is theoretically possible, though very unlikely, that the isotopes may also enter the heat exchanger. If this happens the isotopes will be maintained in the reactor core and the heat exchanger and so the system will remain safe.

By connecting the apparatus to a hydrogen plant and to a synthetic fuel production plant, the apparatus and method of this invention may be used directly to convert synthesis gas to fuel such as methanol and butane. Butane may be used as a gasoline substitute without requiring any further processing. The high temperatures and pressures produced by the apparatus during the process may be used within the synthetic fuel plant to facilitate the conversion.

DETAILED DESCRIPTION OF THE DRAWINGS

By way of example only, one specific embodiment of apparatus of this invention will now be described in detail, reference being made to the accompanying drawings in which:—

Figure 2:
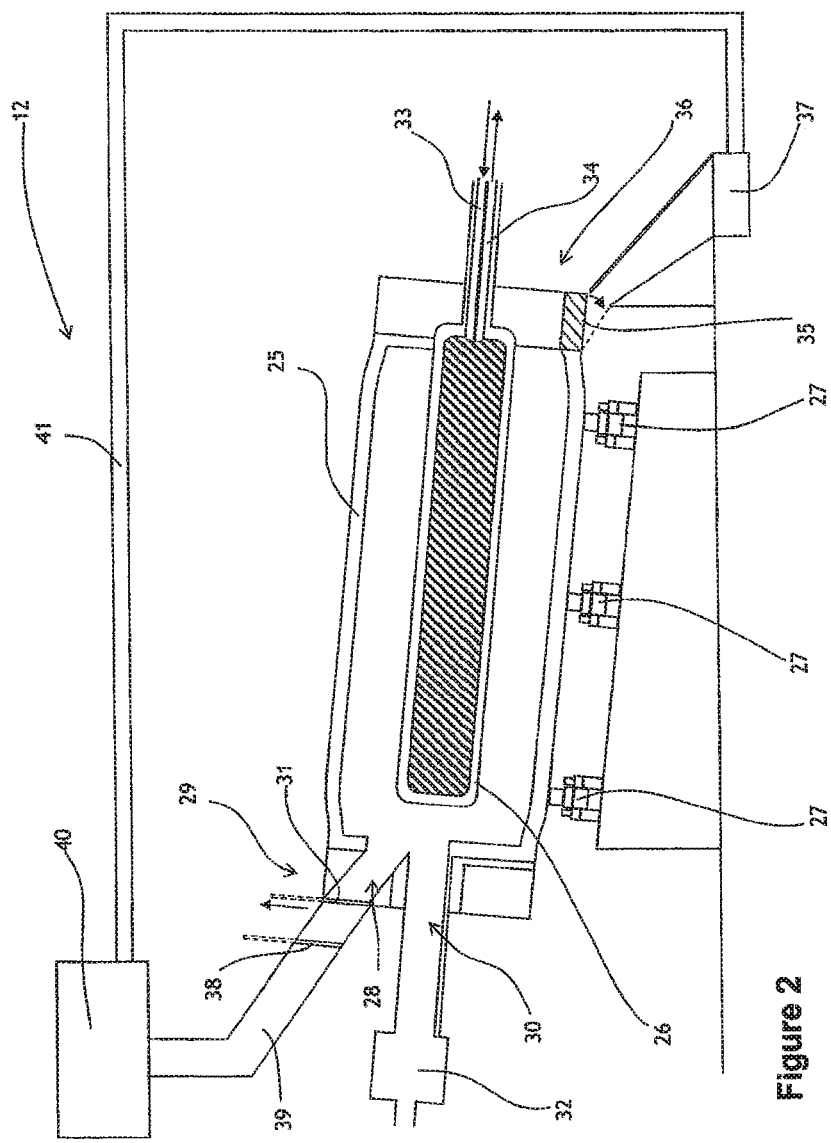

FIG. 1 is schematic view of the apparatus of the present invention incorporated with a system for the production of a synthetic fuel; and FIG. 2 is a front view of a rotary kiln of the apparatus of FIG. 1 for the production of carbon dioxide from limestone.

DETAILED DESCRIPTION OF THE INVENTION

Referring initially to FIG. 1 there is shown apparatus for producing carbon dioxide from limestone including a nuclear reactor 10, a heat exchanger 11 and a rotary kiln 12. The nuclear reactor 10 is a pebble bed nuclear reactor having an inner core 13 which is cooled by a heat transfer fluid 14, such as helium gas circulating through an outer casing 15. The outer casing 15 of the nuclear reactor 10 is connected to the heat exchanger 11 by feed and return primary conduits 17, 18.

The heat exchanger 11 is a boiler having reinforced stainless steel pipes 20 arranged within the boiler 11 so that water in the form of steam may pass through the pipes 20 with the hot heat transfer fluid 14 passing over the outer surface of the pipes 20. In an alternative arrangement, pipes may be arranged within the boiler to allow the hot heat transfer fluid 14 to pass through pipes, with the water in the form of steam passing over the outer surface of those pipes. The reinforced stainless steel pipes 20 are designed to withstand temperatures of in excess of 900° C. A feed secondary conduit 21 and a return secondary conduit 22 connect the steel pipes 20 to the rotary kiln 12. Pumps 23 are provided in each of the conduits 17, 18, 21, 22 to effect the transfer of fluid through the system.

Referring to FIG. 2, the rotary kiln 12 comprises a generally cylindrical vessel 25 having an inner chamber 26 mounted coaxially therein. The vessel 25 is supported on three pairs of horizontally-spaced rollers 27 with the vessel axis inclined at a small angle to the horizontal. At least one roller 27 of each pair includes a motor (not shown) to effect rotation of the vessel 25. The kiln 12 has at its raised end 29 an inlet 28 for the introduction of limestone, that inlet being provided with a gate valve 31. A stationary inlet duct 39 also provided with a gate valve 38 is arranged so that on rotation of the vessel 25, the inlet 28 will come into register with the duct 39 when the inlet 28 is uppermost. When in register and both gate valves are opened, limestone may pass from the duct 39 to the inlet 28 and so into the vessel 25.

At the raised end of the kiln 12, there is provided an outlet pipe 30 for the release of carbon dioxide generated within the vessel. A gas-tight rotary joint (not shown) is arranged between the vessel 25 and the pipe 30 and a valve (also not shown) is disposed within the outlet pipe 30 to control the release of carbon dioxide. The outlet pipe 30 feeds the carbon dioxide to a scrubber 32 to clean the carbon dioxide and remove unwanted effluents.

The inner chamber 26 of the kiln 12 is formed from stainless steel reinforced as necessary to withstand the heat within the vessel 25 and includes an inlet pipe 33 and an outlet pipe 34 which connect respectively to the feed secondary conduit 21 and the return secondary conduit 22. Further pipes may be provided for the delivery of air into the inner chamber 26 of the kiln 12. This may be advantageous to facilitate heat distribution and/or combustion within the kiln. At the lower end 36 of the vessel 25 there is provided a door 35 which when the inlet 28 is in register with the inlet duct 39, comes into register with an outlet duct 42, to enable the removal of quicklime produced by the calcination of limestone within the kiln 12. A gas tight valve (not shown) is disposed within the outlet duct 42 to control the release of quicklime. Beneath the door 35 of the kiln 12, in the duct 42 is an air-to-fluid heat exchanger 37 arranged to cool the quicklime released from the kiln 12 by blowing air over the hot quicklime and transferring the heat to liquid being passed through the heat exchanger. Where air is introduced into the inner chamber, to aid combustion, heat from the air-to-fluid heat exchanger may be used to heat the air before delivery to the kiln.

A pre-heater 40 is connected to the inlet 28 of the rotary kiln 12 and is arranged to heat limestone prior to introduction into the vessel 25. The pre-heater 40 is connected to the air-to-fluid heat exchanger 37 by pipes 41 so that the hot liquid from the air-to-fluid heat exchanger 37 is used to pre-heat the limestone before introduction into the vessel.

In FIG. 1, the apparatus 10, 11, 12 is connected to a hydrogen plant 45 for the production of hydrogen and a synthetic fuel plant 46 for the creation of a synthetic fuel using the carbon dioxide produced from the limestone and hydrogen produced by the hydrogen plant 45. Water pipes 20 within the boiler 11 are connected to a feed third conduit 48 and a return third conduit 49 for the hydrogen plant 45.

To produce carbon dioxide from limestone, the heat transfer fluid 14 in the nuclear reactor 10 is arranged to circulate around the inner core 13 of the nuclear reactor 10 and to the boiler 11 through the feed primary conduit 17. The heat transfer fluid 14 is circulated around the boiler 11 and then back to the nuclear reactor 10 through the return primary conduit 18. In operation, the nuclear reactor 10 generates heat which is transferred to boiler 11 by the heat transfer fluid 14 as it circulates from the nuclear reactor 10 through the primary conduits 17, 18 to the boiler 11. The nuclear reactor 10 is designed to generate temperatures exceeding 900° C.

Water in the form of steam is passed through the pipes 20 within the boiler 11 and is heated yet further by the heat transfer fluid 14 as it circulates through the boiler 11. At these temperatures and pressures there will be only steam present in the pipes 20 of the boiler 11.

High pressure steam from the boiler 11 is passed through the feed secondary conduit 21 to the inlet pipe 33 of the inner chamber 26 of the rotary kiln 12. The steam is circulated through the inner chamber 26 from the inlet pipe 33 to the outlet pipe 34 and through the return secondary conduit 22 to the boiler 11.

Limestone is introduced into the pre-heater 40, where the limestone is heated before it is introduced into the kiln 12, in order to minimise the reduction of temperature within the vessel on introducing a fresh batch of limestone. The pre-heater 40 is supplied with heat produced from the cooling of quicklime previously released from the kiln 12, as described in more detail below. When the apparatus 10, 11, 12 is first used or is used again after a period of non-use, the pre-heater 40 may be provided with heat from some other source.

The rotary kiln 12 is turned to bring the inlet 28 uppermost and in register with the inlet duct 39 so that opening of the gate valves 31, 38 allows the introduction of pre-heated limestone in the cylindrical vessel 25. The valves are closed and the vessel is rotated about the inner chamber 26, so tumbling the limestone in the kiln 12. The steam circulating within the inner chamber 26 causes heat to be transferred to the limestone as it tumbles around the chamber 26, within the cylindrical vessel 25 of the rotary kiln 12. The heating of the limestone causes the calcination thereof. Carbon dioxide and waste effluents pass through the outlet 30 of the kiln 12 to the scrubber 32 to separate the carbon dioxide from the waste effluents. Quicklime produced by the process collects at the lower end 36 of the kiln 12 and can be released into the air-to-fluid heat exchanger 37 to be cooled for further use by opening the door 35 when the vessel is stopped with the inlet 28 uppermost. Hot liquid from the air-to-fluid heat exchanger 37 heated by the quicklime can then be used to heat the limestone in the pre-heater 40 before introduction into the kiln 12.

The invention claimed is:

1. Apparatus for the production of a synthetic fuel using carbon dioxide from limestone, comprising:
   a nuclear reactor for generating heat;
   a rotary kiln comprising an outer rotary vessel for containing limestone and an inner stationary chamber mounted co-axially within the outer rotary vessel, the rotary kiln having an inlet for the introduction of limestone into the outer vessel and an outlet for the release of carbon dioxide;
   a heat transfer arrangement for transferring heat from the nuclear reactor to the inner stationary chamber of the rotary kiln, the heat transfer arrangement including a heat exchanger and feed and return primary conduits for passing a heat transfer fluid through the nuclear reactor and heat exchanger to extract heat therefrom for transfer to the inner stationary chamber of the rotary kiln;
   wherein the heat exchanger comprises a water boiler to generate steam and a secondary conduit for the steam generated by the boiler, to feed heated steam through the inner stationary chamber for the transfer of heat to limestone in the outer rotary vessel to heat the limestone to a temperature sufficient for the release of carbon dioxide;
   wherein the heat exchanger comprises a feed third conduit for steam generated by the boiler;
   a hydrogen plant to produce hydrogen, the feed third conduit supplying steam generated by the boiler to the hydrogen plant to produce hydrogen; and
   synthetic fuel production plant to which carbon dioxide and the hydrogen are fed and in which that are reacted to produce a synthetic fuel.

2. Apparatus as claimed in claim 1, wherein the secondary conduit comprises a feed second conduit for the supply of steam to the rotary kiln and a return second conduit for the re-circulation of steam from the rotary kiln to the boiler.

3. Apparatus as claimed in claim 1, further comprising a return third conduit for the re-circulation of steam from the hydrogen plant to the boiler.

4. Apparatus as claimed in claim 1, further comprising an air-to-fluid heat exchanger in communication with the rotary kiln for receiving and cooling quicklime produced in the rotary kiln when the limestone is heated.

5. Apparatus as claimed in claim 4, further comprising a pre-heater for heating the limestone prior to introduction of the limestone to the rotary kiln.

6. Apparatus as claimed in claim 5, wherein the pre-heater is connected to the air-to-fluid heat exchanger for the supply of heat from the air of the air-to-fluid heat exchanger to the pre-heater.

7. Apparatus as claimed in claim 1, wherein the nuclear reactor is a pebble bed nuclear reactor.

8. A method for producing a synthetic fuel using carbon dioxide from limestone comprising the steps of:
   a) generating heat using a nuclear reactor;
   b) transferring heat from the nuclear reactor to an inner stationary chamber mounted coaxially within an outer rotary vessel of a rotary kiln having an inlet for the introduction of limestone into the outer rotary vessel thereof and an outlet for the release of carbon dioxide therefrom, by circulating a heat transfer fluid through feed and return primary conduits through the nuclear reactor and transferring heat from the heated transfer fluid to a heat exchanger, wherein the heat exchanger comprises a water boiler in which steam is generated, and said steam is fed to the inner stationary chamber of the rotary kiln by a secondary conduit, and wherein the heat exchanger comprises a feed third conduit for steam generated by the boiler;
   c) introducing limestone into the outer rotary vessel of the rotary kiln through the inlet thereof;
   d) operating the rotary kiln to rotate and tumble limestone therein;
   e) collecting carbon dioxide released from the outlet of the rotary kiln wherein the heat transferred to the inner stationary chamber of the rotary kiln and rotation of the outer roatary vessel causes calcination of the limestone in the outer rotary vessel to produce carbon dioxide;
   f) feeding the steam to a hydrogen plant by the feed third conduit and producing hydrogen in the hydrogen plant; and
   g) reacting the hydrogen and the carbon dioxide in a synthetic fuel production plant to produce a synthetic fuel.

9. A method as claimed in claim 8 wherein the steam is fed to the rotary kiln by a feed secondary conduit and the steam is re-circulated from the rotary kiln to the boiler by a return secondary conduit.

10. A method as claimed in claim 8, wherein steam from the hydrogen plant is re-circulated to the boiler by a return third conduit.

11. A method as claimed in claim 8, wherein the limestone is heated by a pre-heater prior to introduction into the rotary kiln.

12. A method as claimed in claim 11, wherein quicklime produced by the calcination of the limestone is collected at a lower end of the rotary kiln and is released to an air-to-fluid heat exchanger for cooling when the rotary kiln is stationary.

13. A method as claimed in claim 12, wherein the pre-heater is supplied with heat from the fluid of the air-to-fluid heat exchanger.

\* \* \* \* \*